Figure 4:
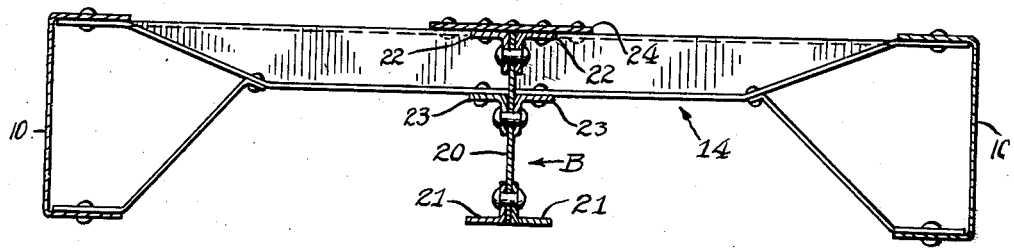

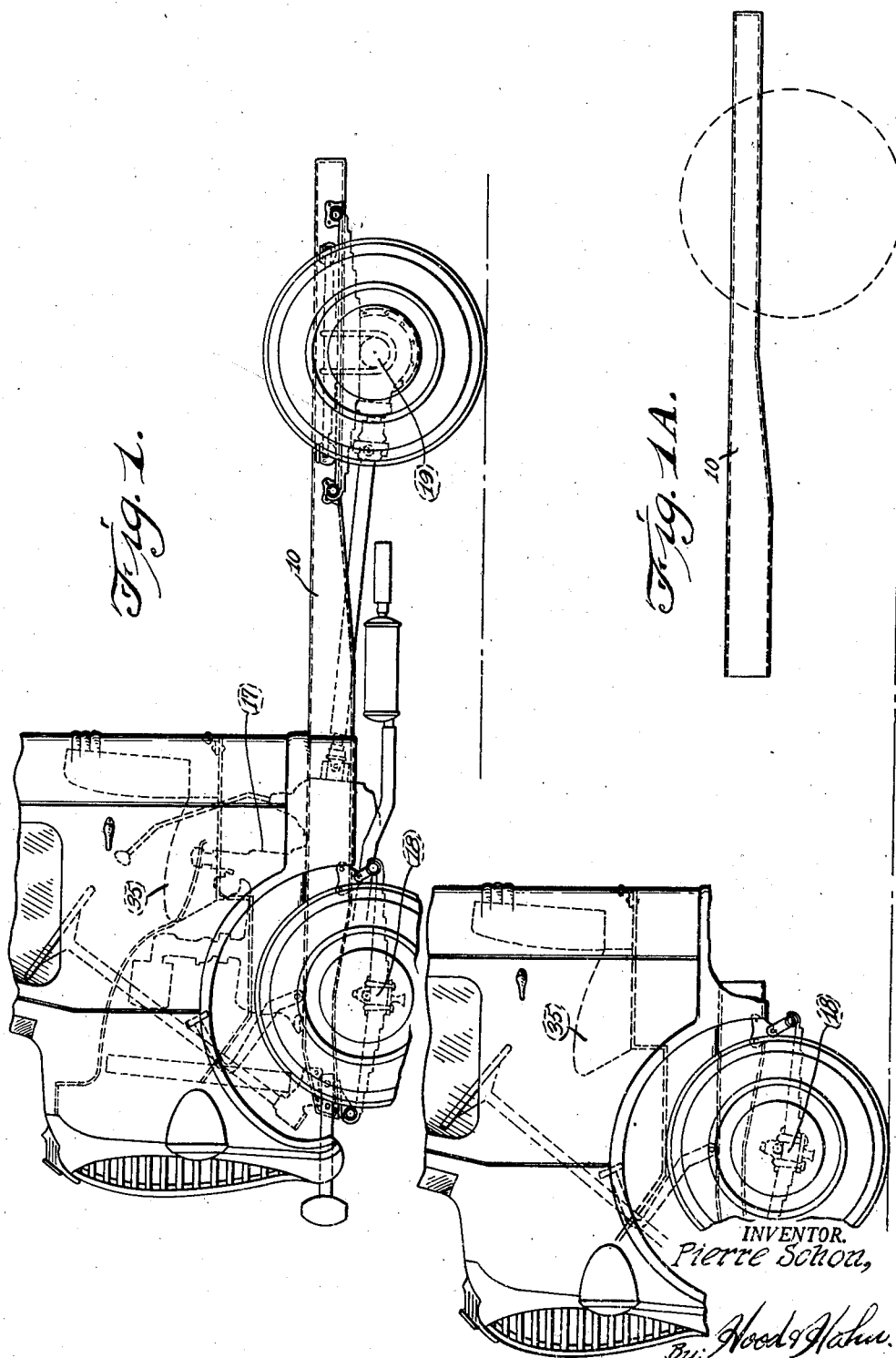

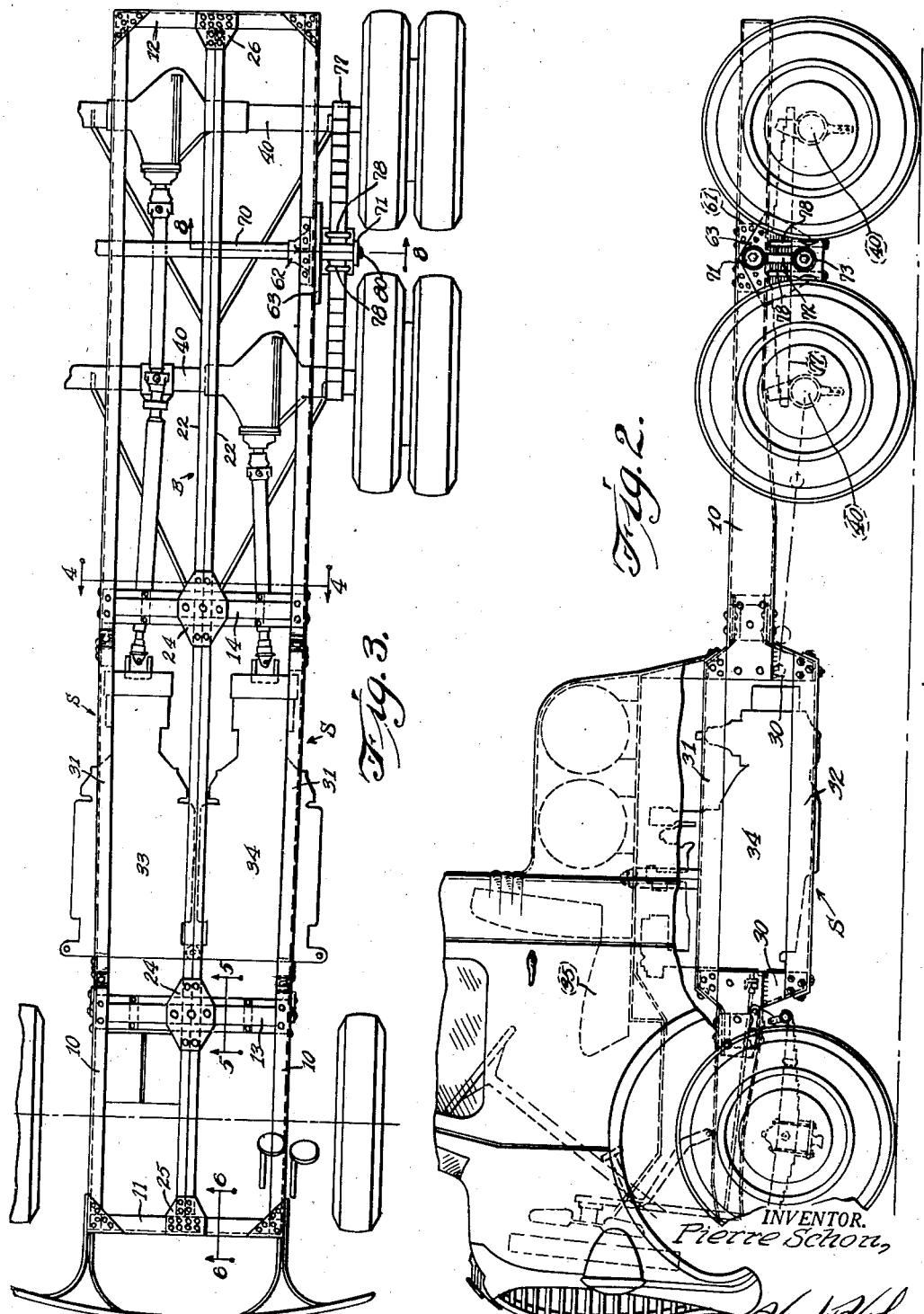

June 13, 1944.    P. SCHON    2,351,233
DUAL MOTOR CHASSIS
Filed Sept. 14, 1942    4 Sheets-Sheet 3

INVENTOR.
Pierre Schon,
BY
Hood & Hahn.
ATTORNEYS.

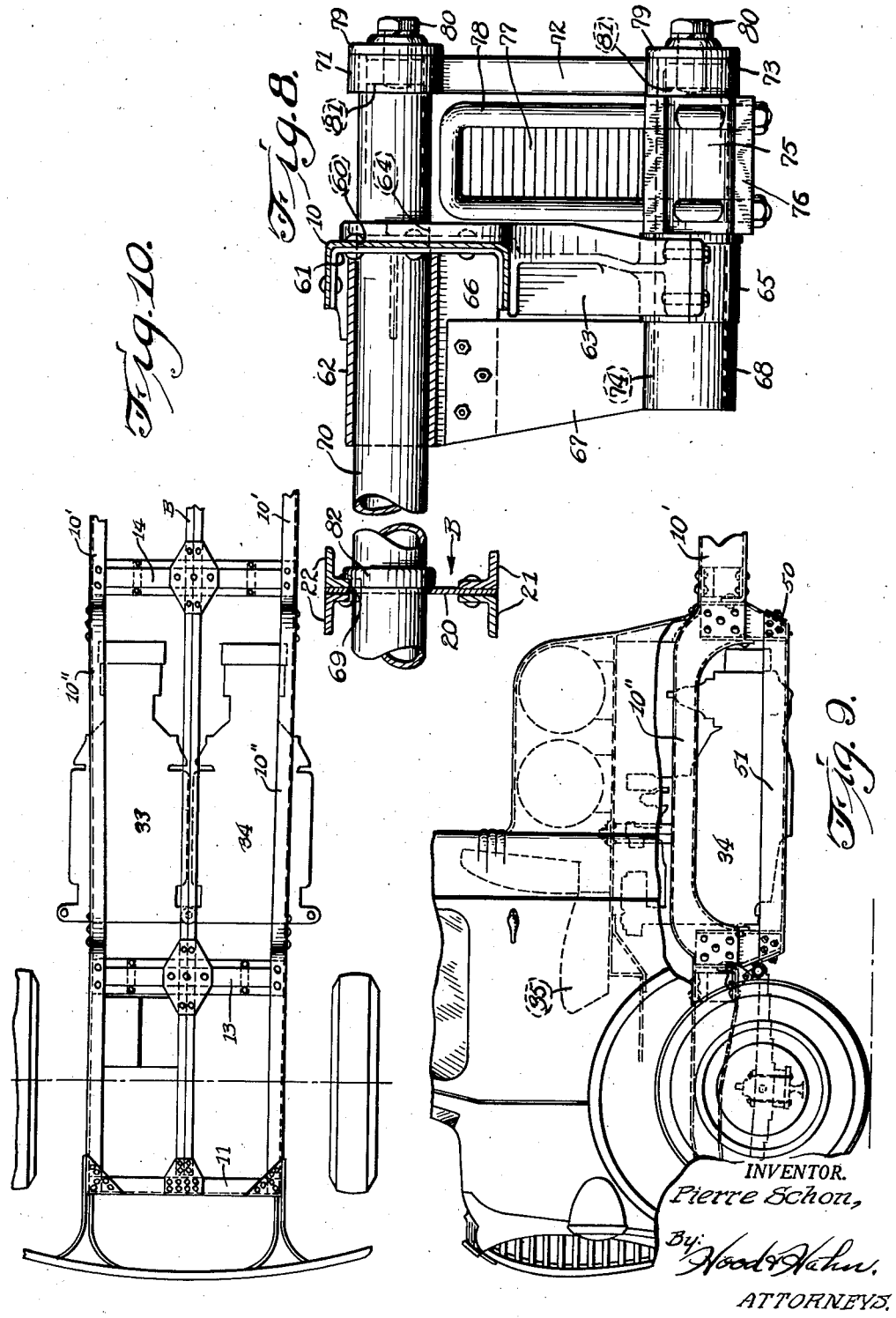

Patented June 13, 1944

2,351,233

UNITED STATES PATENT OFFICE 2,351,233

DUAL MOTOR CHASSIS

Pierre Schon, Indianapolis, Ind., assignor to Marmon-Herrington Company, Inc., Indianapolis, Ind., a corporation of Indiana Application September 14, 1942, Serial No. 458,287

12 Claims. (Cl. 280—106)

The object of my invention is to provide an improved chassis frame for motor vehicles capable of supporting two motor units in such manner as to permit easy installation and removal and without increase in width as compared with a single-engine chassis frame.

A further object of my invention is to economically convert single-engine, one-drive-axle cars, or passenger cars, into dual-engine, two-drive-axle cars. To that end, I utilize, as a basis, a production-line, single-engine chassis, because of its low cost, discarding a minimum of portions and substituting and adding other portions in such manner and form as to provide needed additional strength and accessibility for repair.

Figure 5:
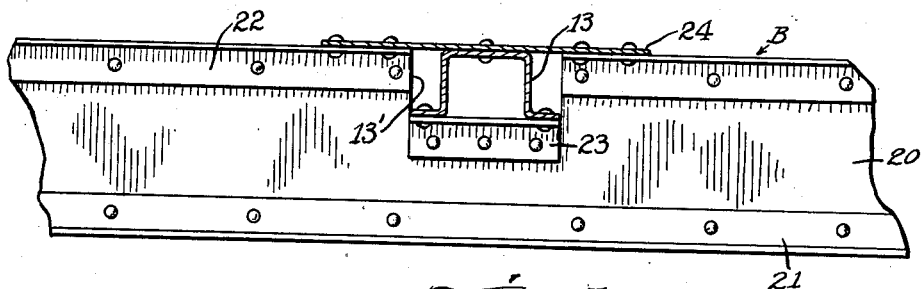
Figure 6:
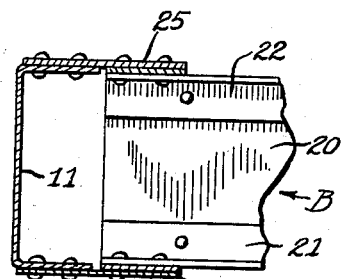
Figure 7:
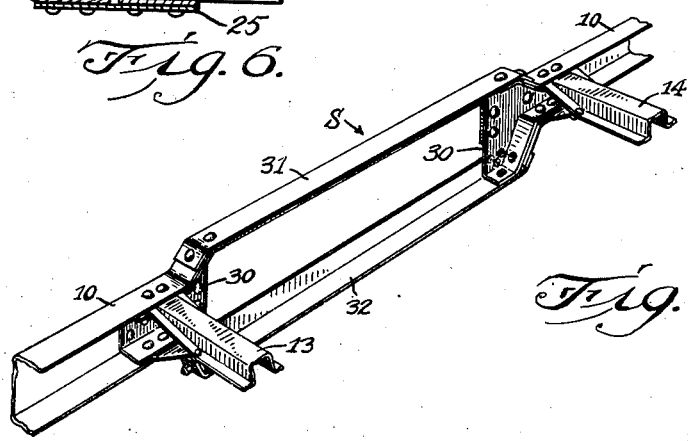

Figs. 1 to 7 of the accompanying drawings illustrate my invention as applied to the present standard "Ford" cab-over-engine truck chassis. Figs. 9 and 10 illustrate another embodiment. In the drawings, Fig. 1 is a side elevation of a standard "Ford" cab-over-engine truck chassis;

Fig. 1A is a side elevation, after removal of the discarded portions of the structure shown in Fig. 1;

Fig. 2 a side elevation of the structure shown in Fig. 1A as supplemented by my invention;

Fig. 3 a plan of the structure shown in Fig. 2;

Fig. 4 a section on line 4—4 of Fig. 3;

Fig. 5 a section on line 5—5 of Fig. 3;

Fig. 6 a section on line 6—6 of Fig. 3;

Fig. 7 a perspective of one of the two side units which are substituted for discarded intermediate portions of side channels to accommodate dual-engines;

Fig. 8 a vertical section, on a larger scale, on line 8—8 of Fig. 3;

Fig. 9 a fragmentary plan of another embodiment of my invention; and

Fig. 10 a fragmentary side elevation of the form shown in Fig. 9, converted from a standard single-engine engine chassis.

Referring first to Fig. 1, 10, 10 indicate the side channels, 11 and 12 the front and rear cross-braces, 13 and 14 the intermediate cross-braces, 17 the engine, 18 the front axle assembly, and 19 the rear driven axle assembly, of the present standard "Ford" cab-over-engine, single-engine chassis.

I start with a production-line chassis because I find it less expensive to discard minor portions and provide additions, than it would be to produce the retained portions in the numbers requisite to supply the present demand for dual-engine units.

Engine 17 and driving axle 19 are removed for replacement in new positions and the sections of the side channels 10 are separated as indicated at X in Fig. 2.

For additional needed strength, I provide a medial longitudinal beam B of sufficient length to extend from front cross-brace 11 to rear cross-brace 12. Beam B, conveniently, comprises (a) the medial plate 20 successively notched in its upper edge at 13', to freely receive cross-braces 13 and 14, (b) allochiral angle irons 21, 21 flanking the lower edge of plate 20 throughout its length, (c) successive pairs of angle irons 22 flanking the upper edge of plate 20 between ends and adjacent notches and between notches, (d) allochiral angle irons 23 subtending notches 13' to engage the under sides of the cross-braces 13 and 14, (e) plates 24, one bridging each notch and attached to adjacent angle irons 22 and to the subtending cross-brace, and, (f) gusset plates 25, 26 connecting the beam with the front and rear cross-braces 11 and 12, respectively.

It will be noted that beam B, lacking plates 24, 25 and 26, may be readily associated with the several cross-braces without disturbing them, whereupon plates 24, 25 and 26 may be riveted or bolted to the angle irons 21 and 22 and the cross-braces, to very firmly brace and strengthen the original chassis-frame.

Bridging the gaps between the separated ends of the sections of the side channels 10, are units S, each of which comprises the two T-plates 30, 30, the upper angle iron 31 and lower angle iron 32 which are parallel and connected to the tips of the heads of the T-plates 30, 30, the lower angle iron 32 being preferably detachably bolted to plates 30, 30 and with its horizontal arm projecting upwardly. The stems of the two T-plates 30 are bolted or riveted to the adjacent ends of the side channel 10, so that the unit S forms a bridge plate somewhat longer than the engines which are to be used. The right engine 33 flanks the beam B on the right and is supported in part on usual rubber cushions supported by the horizontal arm of the lower angle iron 32 of the right hand unit S with a portion of its right hand side projecting through the gap between the upper and lower angle irons. The left hand engine 34 similarly flanks the left hand side of beam B. As shown in Fig. 2, the forward ends of the engines project under the driver's seat 35 and either engine may be readily removed by detaching the adjacent lower angle iron 32 from its unit S and lowering the engine to a plane below the adjacent upper angle iron 31 as the height of the engine is less than the distance between the ground and the lowest part of angle iron 31.

Where two engines are provided, it is generally advisable to provide two independent ground-engaging traction units in order that the available power may be efficiently applied to the ground without slippage. The traction unit may be in the form of independent or connected traction wheels at opposite sides of the vehicle driven by different engines or by the several traction wheels connected to both engines. I prefer, however, to use two standard driven axles 40, 40 instead of the similar single axle commonly furnished with the original vehicle.

Referring now to Figs. 9 and 10—the chassis frame comprises side bars 10", 10', front and rear cross-braces 11, 12, intermediate cross-braces 13 and 14, and the central beam B previously described.

Each of the side bars 10', at an intermediate point, is upwardly arched at 10". Attached to each bar 10' subtending the arch 10", preferably by readily separable connections 50, is a chord 51 spaced below arch 10" to permit side portions of the engine M to project therebetween so that the engine may lie between the beam B and the side bar 10' with portions of its outer side projecting between the arch 10" and the chord 51. The arch 10" lies above the ground level a distance exceeding the overall height of the engine and the engine is supported by suitable brackets engaging beam B and chord 51 so that, by separating chord 51 from bar 10' the engine may be lowered so as to clear the arch and be withdrawable laterally between the arch and the ground. This arrangement is important in war trucks because withdrawal and replacements of engines may be readily accomplished in the absence of repair pits.

It will be readily understood that the chord 51 may be permanently associated with the side bar 10 if there are provided removable supporting brackets or readily separable connections between engine and chord so that the engine may be readily lowered and withdrawn laterally, above ground level, but I believe the removable chord to be the most efficient arrangement.

In order to provide two independent driven axles, one for each engine, I provide the construction shown in detail in Figs. 2, 3, and 8. Each side channel, near its rear end, is perforated at 60 and reinforced by a channel 61 which includes a sleeve 62 aligned with perforation 60. Secured to the outer face of channel 10 is a depending bracket 63, perforated at 64 to align with perforation 60 and provided at its lower end with a sleeve 65 parallel with sleeve 62. Sleeve 62 is provided with a depending flange 66 to which is bolted a depending plate 67 provided at its lower end with a sleeve 68 aligned with sleeve 65.

Extending transversely of the chassis frame through sleeves 62 and a perforation 69 in beam B, is a tube 70 each free end of which receives the eye 71 of a hanger 72 provided at its lower end with an eye 73 aligned with sleeve 65. Mounted in sleeves 68, 65 and eye 73, and bridging the gap between 65 and 73, is a tube 74 which receives and supports spring seat 75 and clamping block 76. The leaf spring 77, the opposite ends of which rest respectively on the axles 40, 40, is clamped upon seat 75 by the usual clamping clips 78, 78. Hanger 72 is held in place by disks 79, 79 which, in turn, are held in place by bolts 80 threaded into plates 81 welded in the ends of tubes 70 and 74. By this arrangement spring 77 is free to rock about the axis of tube 74. Beam B, at perforation 69, is reinforced by collars 82 surrounding tube 70.

I claim as my invention:

1. In a motor vehicle chassis frame comprising, side-bars and cross-braces connecting the side-bars adjacent their ends and at intermediate points, a longitudinal central beam having an overall length to span the distance between two cross-braces between which at least one intermediate brace exists, said beam being notched to receive each intermediate cross-brace, a bridge plate spanning the open end of each notch, fastening means connecting lower regions of the central beam and each intermediate cross-brace with the ends of said bridge plate secured to upper regions of the beam adjacent the overlaid cross-brace, and means for fastening the ends of the beams to adjacent cross-braces.

2. As a substitute for an intermediate removed section of a side-bar of a chassis frame, a bridge-piece comprising two longitudinal vertically-separated bars and two connecting end pieces attachable to the separated ends of frame side-bars, the vertical separation of said longitudinal bars being such as to permit projection therebetween of side portions of an engine.

3. As a substitute for an intermediate removed section of a side-bar of a chassis frame, a bridge frame comprising two vertically-separated longitudinal bars and two T-plates connectable with said longitudinal bars with their stems projecting in opposite directions for attachment to the separated ends of said side bar.

4. A structure of the character specified in claim 3, wherein the lower longitudinal bar of the bridge is readily separable from the T-plates and formed to support an adjacent engine.

5. A chassis frame comprising a medial longitudinal beam, a plurality of cross-braces, side bars at each side of the frame extending from end cross-braces toward, but not to, each other, and a bridge-piece connecting the separated ends of the side bars, said bridge-piece comprising two vertically-separated longitudinal bars and two end plates, each connected to said longitudinal bars and the adjacent end of one of said cross-braces.

6. A structure of the character specified in claim 5, wherein the lower longitudinal bar of the bridge is readily separable from the end plates and formed to support an adjacent engine.

7. A chassis frame comprising two side-bars, a central beam and connecting cross bars, each of said side-bars having a medial upwardly arched portion and a chord subtending the arch, vertically spaced below the arch to permit projection of an engine side portion therebetween.

8. A chassis frame comprising two side-bars, a central beam and connecting cross bars, each of said side-bars having a medial upwardly arched portion and a separable chord subtending the arch, vertically spaced below the arch to permit projection of an engine side portion therebetween.

9. A chassis frame of the character specified in claim 7 wherein, when associated with carrying wheels, the arch is sufficiently elevated to permit lateral withdrawal of an engine between it and normal ground level.

10. A chassis frame of the character specified in claim 8 wherein, when associated with carrying wheels, the arch is sufficiently elevated to permit lateral withdrawal of an engine between it and normal ground level.

11. A chassis frame having side bars each comprising an upwardly arched medial portion subtended by a cord vertically spaced therefrom to afford room for projection outwardly therebetween of a side portion of an engine.

12. As a substitute for an intermediate removed section of a side-bar of a chassis frame, a bridge-piece comprising two longitudinal vertically-separated bars and two connecting end pieces attachable to the separated ends of frame side-bars, the vertical separation of said longitudinal bars being such as to permit projection therebetween of side portions of an engine, and the lower longitudinal bar being readily removable to permit downward withdrawal of said engine.

PIERRE SCHON.